(12) United States Patent
Takemoto

(10) Patent No.: US 6,172,767 B1
(45) Date of Patent: Jan. 9, 2001

(54) MULTI-COLOR IMAGE FORMING APPARATUS AND MULTI-COLOR IMAGE FORMING METHOD

(75) Inventor: Shinichi Takemoto, Toyokawa (JP)

(73) Assignee: Minolta Co., Ltd., Osaka (JP)

( * ) Notice: Under 35 U.S.C. 154(b), the term of this patent shall be extended for 0 days.

(21) Appl. No.: 08/970,896

(22) Filed: Nov. 14, 1997

(30) Foreign Application Priority Data

Nov. 15, 1996 (JP) .................................................. 8-304638

(51) Int. Cl.[7] .................................................. G06F 15/00
(52) U.S. Cl. .......................... 358/1.9; 358/447; 358/448; 358/515; 358/521; 358/535; 358/536; 382/162
(58) Field of Search ............................ 395/109; 358/447, 358/448, 458, 515, 521, 518, 1.9, 534, 535, 536, 537; 382/162, 167

(56) References Cited

U.S. PATENT DOCUMENTS

| 4,814,886 | 3/1989 | Kuge et al. ............................ 358/293 |
| 4,903,123 | 2/1990 | Kawamura et al. .................... 358/75 |
| 5,055,923 | * 10/1991 | Kitagawa et al. .................... 358/534 |
| 5,815,287 | * 9/1998 | Yamada ................................ 358/458 |

FOREIGN PATENT DOCUMENTS 58-173972   10/1983   (JP) .

* cited by examiner

Primary Examiner—Edward L. Coles
Assistant Examiner—Mark Wallerson
(74) Attorney, Agent, or Firm—Sidley & Austin

(57) ABSTRACT

A multi-color image forming apparatus and method to form a color image by overlapping multiple gradation pattern images formed for each of the recording colors based on the input color image information, wherein the screen angles of the unit gradation patterns of the multiple gradation pattern images are set such that they are separated from one another by 20 degrees or more, and in which the first unit gradation pattern is formed using a line pattern in which the colored dot patterns are made to extend in the direction corresponding to a first screen angle and the second unit gradation pattern is formed using a line pattern in which the colored dot patterns are made to extend in the direction corresponding to a second screen angle which is different from the first screen angle by 90 degrees.

16 Claims, 11 Drawing Sheets

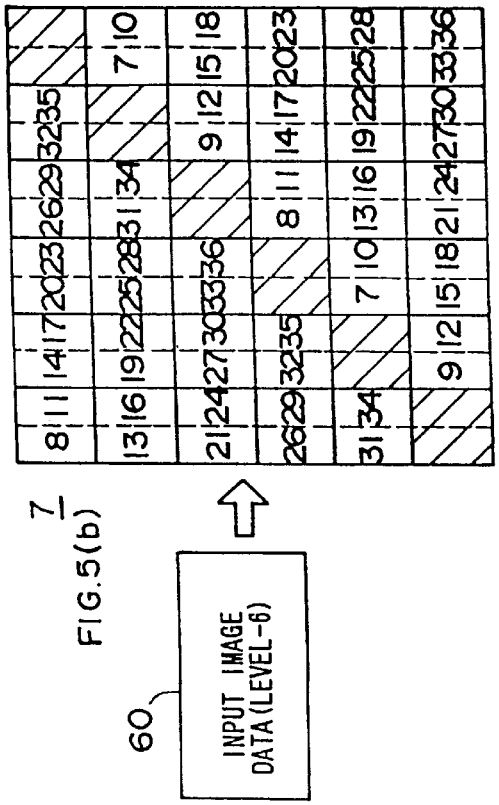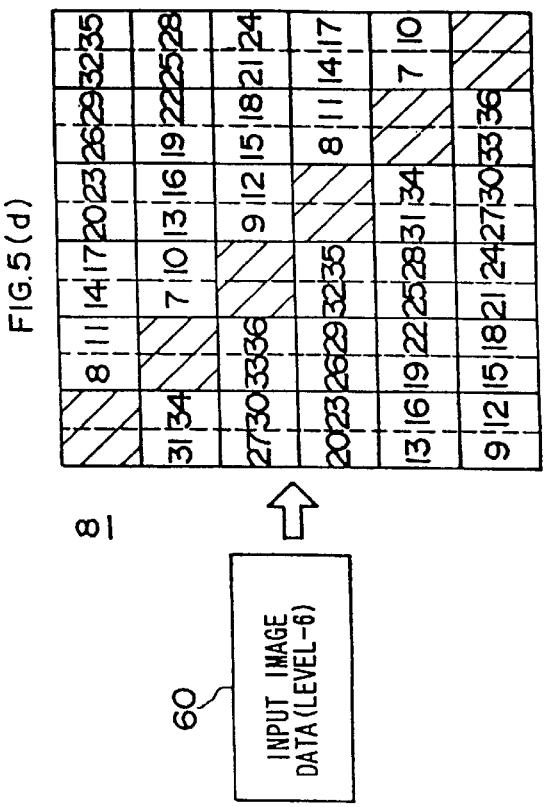

| 14 | 7 | 11 | 15 |
|----|---|----|----|
| 10 | 2 | 3  | 8  |
| 6  | 1 | 4  | 12 |
| 13 | 9 | 5  | 16 |

| 29 | 25 | 10 | 14 | 18 | 22 | 26 | 30 |
|----|----|----|----|----|----|----|----|
| 21 | 13 |    | 2  |    | 3  | 11 | 19 |
| 17 |    |    | 1  |    | 4  |    |    |
|    | 9  |    | 7  |    | 6  | 15 | 23 |
|    |    | 8  |    | 5  |    |    |    |
| 32 | 28 | 24 | 20 | 12 | 16 | 27 | 31 |

| 14 | ▨ | 11 | 15 |
|----|---|----|----|
| 10 | ▨ | ▨  | 8  |
| ▨  | ▨ | ▨  | 12 |
| 13 | 9 | ▨  | 16 |

INPUT IMAGE DATA (LEVEL-7)  70

| 16 | 9 | 5 | 13 | 17 |
|----|---|---|----|----|
| 6  | 1 | 4 | 12 |    |
| 10 | 2 | 3 | 8  |    |
| 15 | 7 | 11| 14 |    |

BLACK

MAGENTA

BLACK and MAGENTA

BLACK and MAGENTA

MULTI-COLOR IMAGE FORMING APPARATUS AND MULTI-COLOR IMAGE FORMING METHOD

BACKGROUND OF THE INVENTION

1. Field of the Invention

The present invention pertains to a multi-color image forming apparatus and method that express darkness levels by changing the ratio of dots in each pixel, based on pixel gradation signals, to form a multi-color image.

2. Description of the Prior Art

As a consequence of the popularity of personal computers for home use, image forming devices such as full color printers have come to be increasingly used in households as well as by businesses.

Dithering is one method by which to express gradation using an image forming device employing the electrophotographic method.

Specifically, dithering involves contrasting and comparing input image information 70 of the input image shown in FIG. 6(c) and each threshold component of the threshold matrix shown in FIG. 6(a), and expressing gradation by means of control such that if input image signal of each pixel is larger than the corresponding threshold component, as shown in FIG. 6(c), dots are formed at positions corresponding to the threshold components, while if input image signal of each pixel is smaller than the corresponding threshold component, dots are not formed. Here, in FIG. 6(c), the input image level is assumed to be 7. In addition, a 16-level image reproduction is possible using the threshold matrix of FIG. 6(a), but the gradation level may be increased through duty modulation controlling the time of laser irradiation, as shown in FIG. 6(b).

Besides the dithering described above, a method is also used in which, as shown in FIGS. 7(a) through 7(h), output patterns corresponding to each level of input image information are set beforehand, a look-up table (LUT) is prepared, and an image is output with reference to the prepared look-up table.

When applying these gradation expression methods to the formation of color images, for example, as shown in FIGS. 9(a) and 9(b), where a black image and a magenta image are placed one over the other using the same threshold matrix, due to a lack of uniformity of distance between the output dots or misalignment of the printed characters resulting from uneven pitch, etc., caused by uneven rotation of the photoreceptor, etc., the dots may be placed directly on top of each other, as shown in FIG. 9(c), or they may conversely be placed in alternating locations, as shown in FIG. 9(d). When this occurs, if the dots are placed directly on top of each other as shown in FIG. 9(c), the color appears closer to black, whereas if the dots are placed in alternating positions as shown in FIG. 9(d), the color appears closer to red, such that if an image of uniform density is printed, unevenness in color occurs due to the discrepancy in the way the dots are placed one on top of the other.

Therefore, it has been considered how to prevent the occurrence of color unevenness by establishing a screen angle for each gradation pattern image corresponding to each color in order to disperse the placement of the dots on top of each other.

For example, in dithering, the screen angle may be set by arranging a plurality of unit gradation patterns produced by unit threshold matrices like the one shown in FIG. 8(a). The unit gradation patterns are arranged in a non-sequential order. The gradation pattern image shown in FIG. 8(b) comprises unit gradation patterns like the one shown in FIG. 8(a), which are displaced horizontally to the right by distance 'a', or four pixels, and displaced vertically downwardly by distance 'b', or one pixel, therefore resulting in a screen angle $\theta1$, corresponding to the direction of line c. The $\tan \theta1 = \frac{1}{4}$ and screen angle $\theta1 \approx 14$ degrees. It can also be said that the unit gradation patterns arranged as shown in FIG. 8(b) also comprises unit gradation patterns like the one shown in FIG. 8(a), which are displaced horizontally to the left by a distance b' of one pixel and displaced vertically downwardly by a distance a' of four pixels, therefore resulting in a screen angle $\theta2$ corresponding to the direction of the line c', so that the screen angle $\theta2 \approx 104$ degrees. In other words, the gradation pattern image by arranging unit gradation patterns as shown in FIG. 8(b) has two screen angles $\theta1$ and $\theta2$ that are perpendicular to each other. In other words, the screen angle $\theta2$ equals screen angle $\theta1$ plus $90°$ and line c' is perpendicular to line c. This characteristic is to be called the two-directional characteristic of screen angles.

The resolution (number of lines) of the image that is output using the threshold matrix shown in FIG. 8(b) is inversely proportional to the length of the line c that is obtained by connecting the centers of two neighboring unit threshold matrices and is set such that the image resolution will be essentially the same for all the colors. Resolution will be indicated hereinafter as 'c'. If the difference between the screen angles of the gradation pattern images for any two colors is small, the texture (rosettes) will stand out, as shown in FIGS. 10 and 11. Therefore, it is necessary that the difference between screen angles for any two colors be set as large as possible.

In the multi-color image forming apparatus and method using conventional dithering, however, because the number of threshold components that comprises the unit threshold matrix is limited to a certain number or less, only a limited number of discrete values are available for setting of the screen angles, and if it is attempted to give the image high resolution, the number of threshold components becomes further limited, as do the values of the screen angles that can be set. In addition, as described above, in conventional dithering, the gradation pattern image has two screen angles $\theta1$ and $\theta2$ that are perpendicular to each other, as a result of which the screen angles for gradation pattern images for the recording colors that can be set will be further limited.

As described above, in the conventional multi-color image forming apparatus and method, even if different screen angles are set for each gradation pattern image for each recording color, the difference between screen angles cannot be set to be large. Consequently, the problems arise that the occurrence of color unevenness cannot be adequately prevented or that ring-like texture (rosettes) will occur cyclically, reducing image quality.

SUMMARY OF THE INVENTION

The object of the present invention is to provide a multi-color image forming apparatus and method which resolve the problems described above and which are capable of forming multi-color images in which the occurrence of color unevenness is prevented and the texture is inconspicuous.

The present invention was made based on the discovery that the change in the size of the area of the part where dots overlap may be reduced, said change being caused by unevenness in printing position, and the differences between the screen angles for any two recording colors may be set to be large by forming at least two of the gradation pattern images for the recording colors using line patterns.

In other words, one aspect of the present invention provides a multi-color image forming apparatus that forms a color image by overlapping multiple gradation pattern images that are formed for each of the recording colors based on the input color image information, wherein the first gradation pattern image among the multiple gradation pattern images is formed using unit gradation patterns each of which is constituted by a line pattern in which dot patterns are made to grow in the direction corresponding to a first screen angle, and another gradation pattern image among the multiple gradation patterns, i.e., the second gradation pattern image, is formed using unit gradation patterns each of which is constituted by a line pattern in which dot patterns are made to grow in the direction corresponding to a second screen angle which is different from the first screen angle by 90 degrees.

Another aspect of the present invention provides a multi-color image forming method to form a color image by overlapping multiple gradation pattern images that are formed for each of the recording colors based on the input color image information, wherein the first gradation pattern image among the multiple gradation pattern images is formed using unit gradation patterns each of which is constituted by a line pattern in which dot patterns are made to grow in the direction corresponding to a first screen angle, and another gradation pattern image among the multiple gradation patterns, i.e., the second gradation pattern image, is formed using unit gradation patterns each of which is constituted by a line pattern in which dot patterns are made to grow in the direction corresponding to a second screen angle which is different from the first screen angle by 90 degrees.

In addition, gradation pattern images other than the first and second gradation pattern images are set such that their screen angles are different from the first or second screen angles by 20 degrees or more.

Further, each of the gradation patterns is formed using a threshold matrix that corresponds to each of the screen angles.

These and other objects, advantages and features of the invention will become apparent from the following description thereof taken in conjunction with the accompanying drawings, which illustrate specific embodiments of the invention.

BRIEF DESCRIPTION OF THE DRAWINGS

In the following description, like parts are designated by like reference numbers throughout the several drawings.

FIGS. 4(a) through 4(d) show the threshold matrices used for the multi-color image forming apparatus shown in FIG. 1 and unit gradation patterns that are formed using the threshold matrices.

FIGS. 5(a) through 5(d) show the threshold matrices used for a variation of said embodiment of the multi-color image forming apparatus and unit gradation patterns that are formed using the threshold matrices.

DETAILED DESCRIPTION OF THE PREFERRED EMBODIMENTS

The multi-color image forming apparatus of an embodiment of the present invention is explained below with reference to the drawings.

Figure 1:
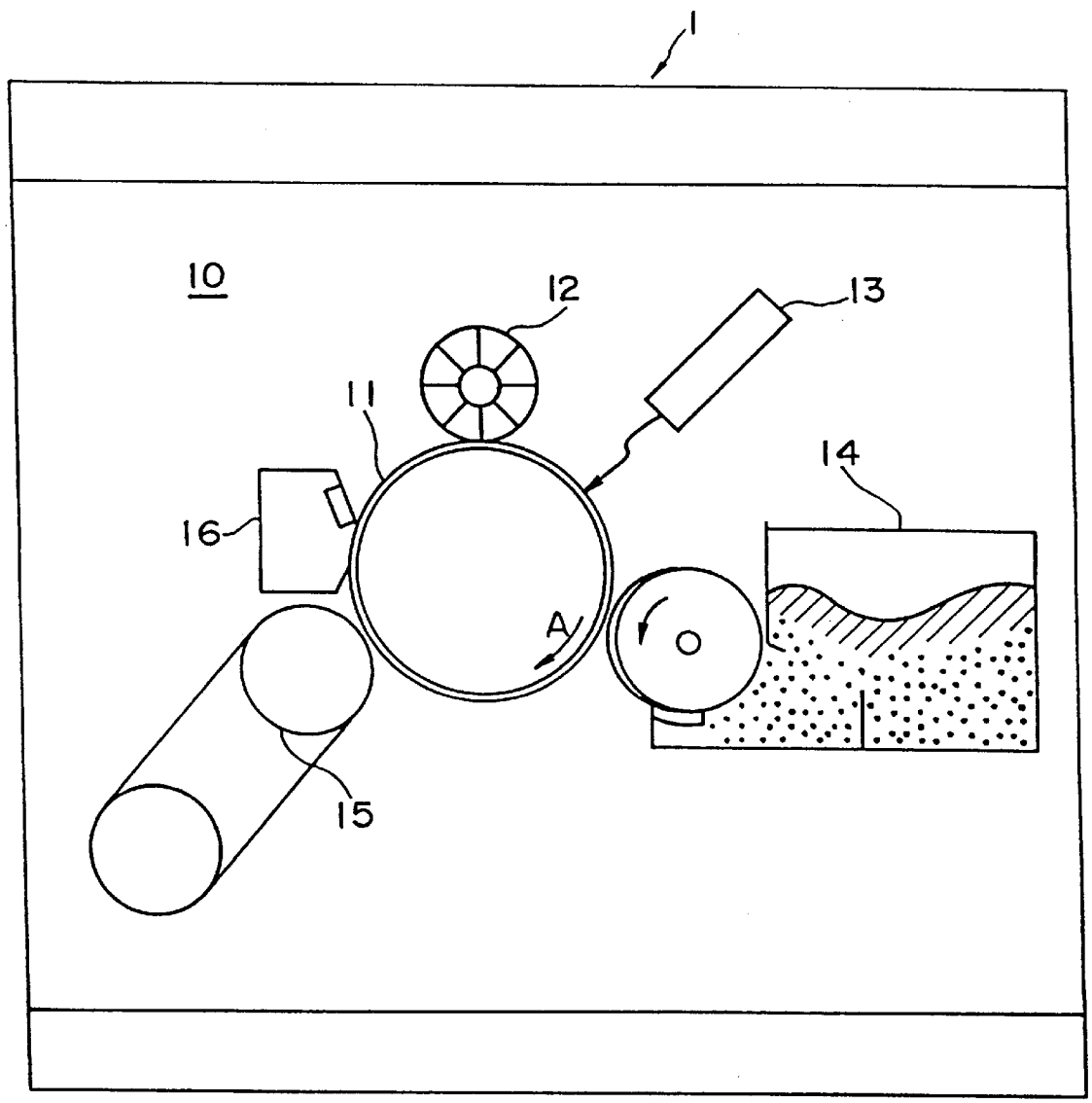
FIG. 1 is an outline drawing showing the construction of the image forming unit of the multi-color image forming apparatus pertaining to an embodiment of the present invention.

FIG. 1 is a block diagram showing the construction of image forming unit 10 of image forming apparatus (color copying machine) 1 of this embodiment. Photoreceptor (photoelectric conductor) 11 that has an organic photoconductive material applied to its surface and that operates as an image carrier is mounted in this image forming unit 10 such that it may rotate in the direction of arrow A. Mounted around the photoreceptor 11, in sequential order along its direction of rotation, is a charger brush 12, a laser exposure device 13, a developing device 14, a intermediate transfer member 15, and a cleaner unit 16.

In image forming unit 10 shown in FIG. 1, photoreceptor 11 rotates in the direction of arrow A. After the photoreceptor 11 is charged up to a certain level of potential by means of the discharge of charger brush 13 that rotates in the same direction as the direction of rotation of photoreceptor 11, a laser beam irradiates the surface of photoreceptor 11 by means of laser exposure device 13 in response to the image information, whereupon an electrostatic latent image is formed in the charged area. The electrostatic latent image is then carried to the developing area where toner is supplied from developing device 14 and the electrostatic latent image is developed into a toner image.

In the case of full-color image forming unit 10, the process described above is sequentially repeated by the developing devices of several colors and the images thus formed are overlapped. In this embodiment, the recording colors comprise four colors, i.e., yellow, magenta, cyan and black. The process described above is performed in sequence by four developing devices, each for one of these colors.

The toner image developed on photoreceptor 11 is carried to the transfer area, where it is transferred to intermediate transfer member 15 to which a voltage having the opposite polarity from the toner has been applied.

The toner images of the four colors are overlapped on intermediate transfer member 15 so that a multi-color image is obtained. The multi-color toner image is electrostatically transferred to the recording medium by means of a final transfer member (not shown in the drawing), and carried to the fixing device (not shown in the drawing), where the multi-color toner image is bonded to the recording medium and a full-color image is formed.

The toner that is not transferred in the intermediate transfer member and remains on the photoreceptor 11 is collected in cleaner unit 16.

Figure 2:
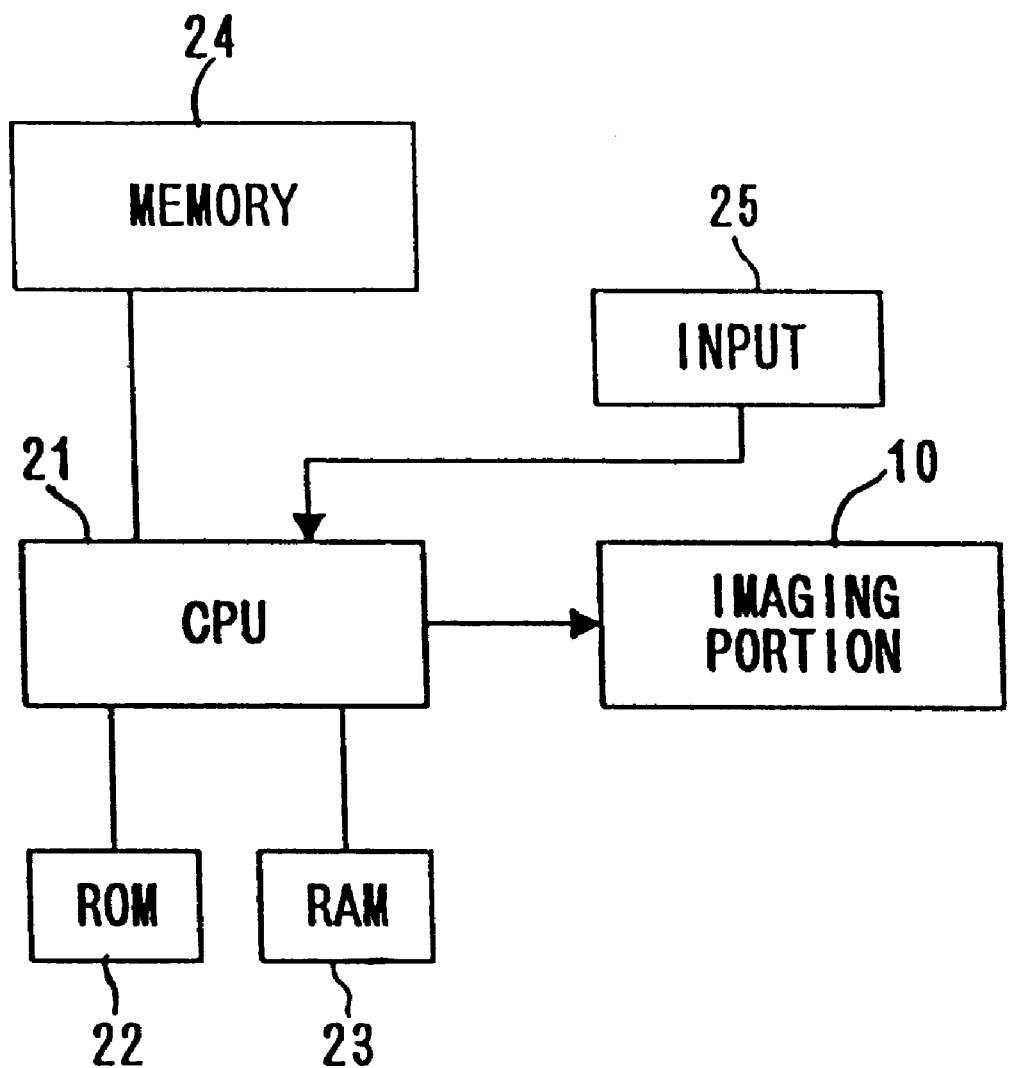
FIG. 2 is a block diagram showing the construction of the control unit that controls the image forming unit shown in FIG. 1.
Figure 3:
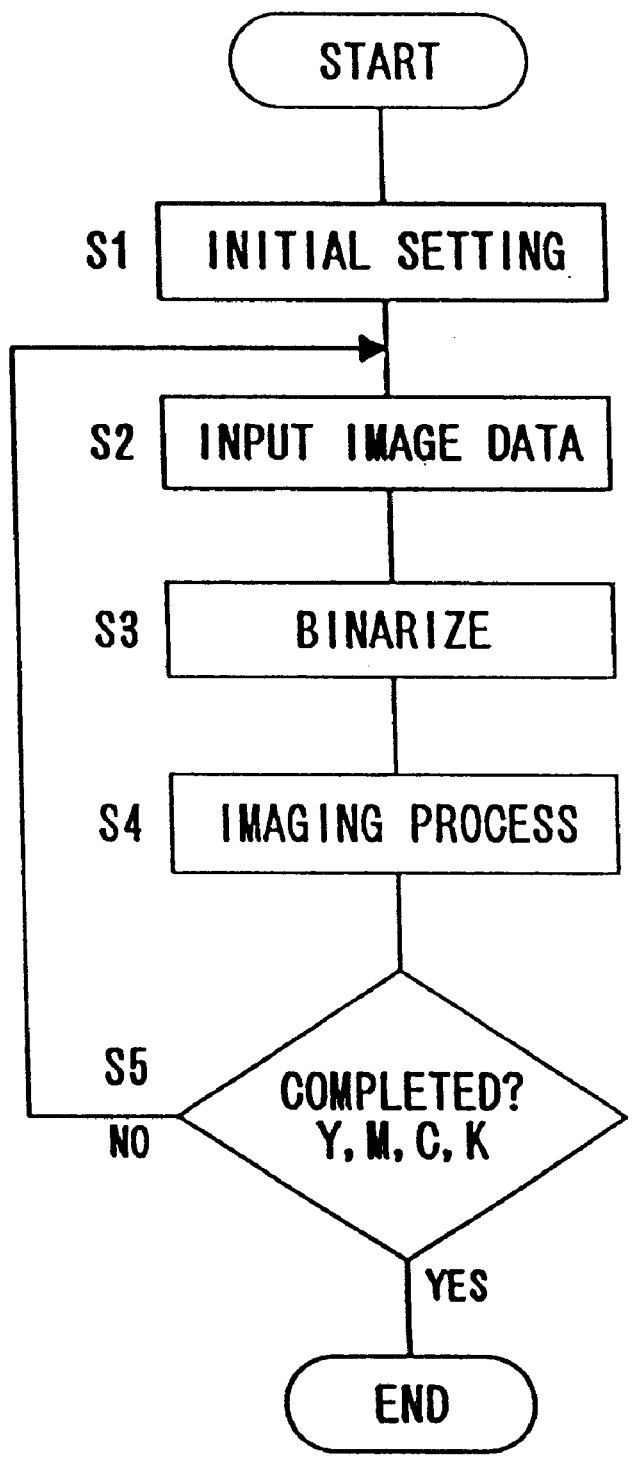
FIG. 3 is a flow chart that shows the sequence of processing by the control unit shown in FIG. 2.
Figures 6A, 6B, 6C:
FIGS. 6(a) through 6(c) show the conventional threshold matrices and unit gradation patterns that is formed using one of the threshold matrices.
Figure 7E:
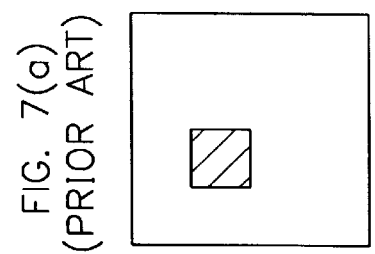
FIGS. 7(a) through 7(h) show output patterns that correspond to various input levels that are set in a look-up table for the conventional example.
Figure 7D:
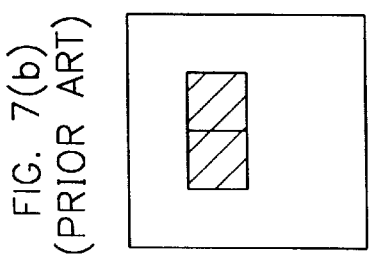
Figure 7H:
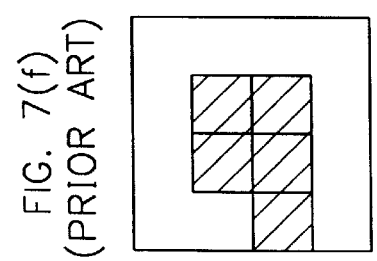
Figure 7C:
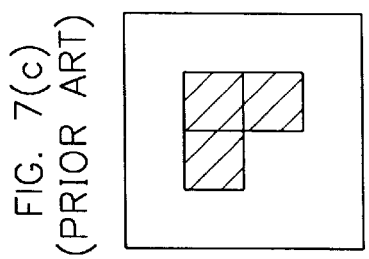
Figure 7G:
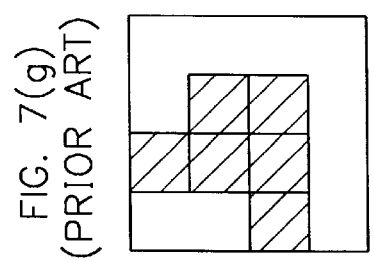
Figure 7B:
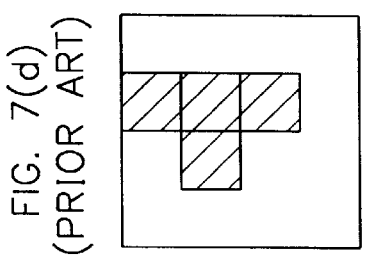
Figure 7F:
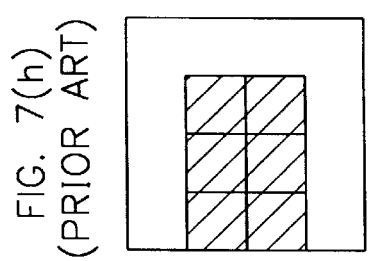
Figure 7A:
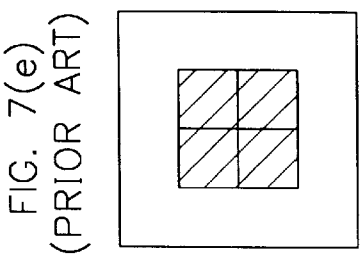

FIG. 2 is a block diagram that shows the control unit in the multi-color image forming apparatus of this embodiment, which controls image forming unit 10 shown in FIG. 1. This control unit comprises CPU 21, ROM 22 in which control programs, etc. are stored, RAM 23 which is a working memory, memory 24 that temporarily stores image data that is input, and input unit 25, and controls image forming unit 10 in accordance with the flow chart of FIG. 3. In other words, this control unit is initialized in step S1, and reads from memory 24 the input image information regarding one color from the input image data in step S2. Next, in step S3, the control unit binarizes the input image information by comparing it against the threshold matrix stored in ROM 22. The control unit then turns ON and OFF laser exposure device 13 shown in FIG. 1 to form an image in step S4 based on the binarized input image information. Through this image forming process, a gradation pattern image for one color is formed in image forming unit 10.

In step S5, the control unit determines whether or not the image forming processes for each of the four colors have been completed. Where they have not been completed, the control unit repeats the processes of steps S2 through S4 for the remaining colors. The multi-color image forming apparatus of this embodiment forms gradation pattern images for each of the four colors in this way. The multi-color image forming apparatus forms a full-color image by overlapping these four gradation pattern images and outputs the final image.

The multi-color image forming apparatus of this embodiment is particularly characterized in that:

(1) the first gradation pattern image that is formed for the first color is formed using unit gradation patterns in which dot patterns are made to grow linearly in the direction corresponding to a first screen angle;

(2) the second gradation pattern image that is formed for the second color is formed using unit gradation patterns in which dot patterns are made to grow linearly in the direction corresponding to a second screen angle which is different from the first screen angle by 90 degrees; and (3) the two gradation pattern images for the third and fourth colors are formed by aligning their unit gradation patterns such that their screen angles will be different from the first screen angle and the second screen angle by 20 degrees or more, and such that the difference between the screen angle of the unit gradation patterns of the third gradation pattern image and the screen angle of the unit gradation patterns of the fourth gradation pattern image will be 20 degrees or more.

The formation and setting methods for the processes described in paragraphs (1), (2) and (3) above are explained in detail below.

First, in this embodiment, the unit gradation patterns of the first and second gradation pattern images are formed using threshold matrix 1 shown in FIG. 4(a) and threshold matrix 2 shown in FIG. 4(c), respectively. In other words, in threshold matrix 1, the threshold components for levels 1 through 8 are aligned in the second row, the threshold components for levels 9 through 16 are aligned in the first row, the threshold components for levels 17 through 24 are aligned in the third row and the threshold components for levels 25 through 32 are aligned in the fourth row, as shown in FIG. 4(a). By using threshold matrix 1 constructed in this fashion, for level 8 input image information 80, for example, the unit gradation pattern for the first gradation pattern image 3 shown in FIG. 4(b), in which dot patterns are formed in a line in the area that corresponds to the second row that has threshold components of level 8 or smaller, may be formed. In this specification, in explaining the threshold matrices and gradation pattern images, the rows and columns of the matrix and image will be respectively called the first row, second row, third row, and fourth row sequentially from the top row in the drawing, and the first column, second column, etc., from the leftmost column in the drawing.

As shown in FIG. 4(c), in threshold matrix 2, threshold components for levels 1 through 4 are aligned in the third column, threshold components for levels 5 through 8 are aligned in the fourth column, and increasingly larger threshold components are sequentially aligned in the fifth, sixth, seventh, eighth, first and second columns in said order. Using threshold matrix 2 constructed in this way, for level 8 input image information 80, for example, the unit gradation pattern of the second gradation pattern image 4 shown in FIG. 4(d), in which dot patterns are formed in a line in the area that corresponds to the third and fourth columns that have threshold components of level 8 or smaller, may be formed.

As shown in FIGS. 4(b) and 4(d), when the two line-shaped unit gradation patterns 3 and 4 in which dot patterns are made to grow in different directions (two colors) are overlapped, even if the printing position is displaced due to pitch unevenness, etc., the area where the dots overlap does not change. Consequently, no unevenness in coloring occurs. Nor does texture noise occur, because the difference between the screen angles is large at 90 degrees.

Figure 10:
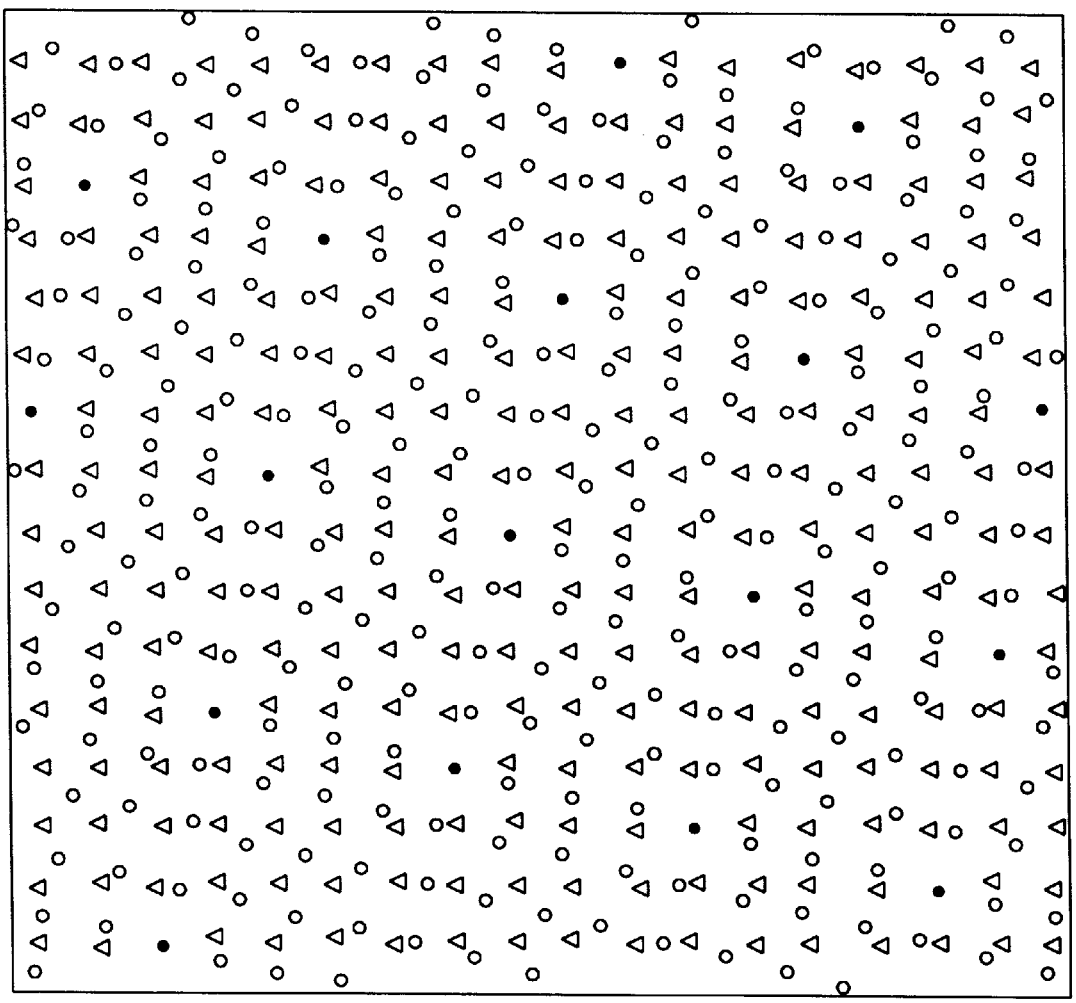
FIG. 10 is a drawing showing the texture noise when the screen angles are set at 0 and 14 degrees.
Figure 11:
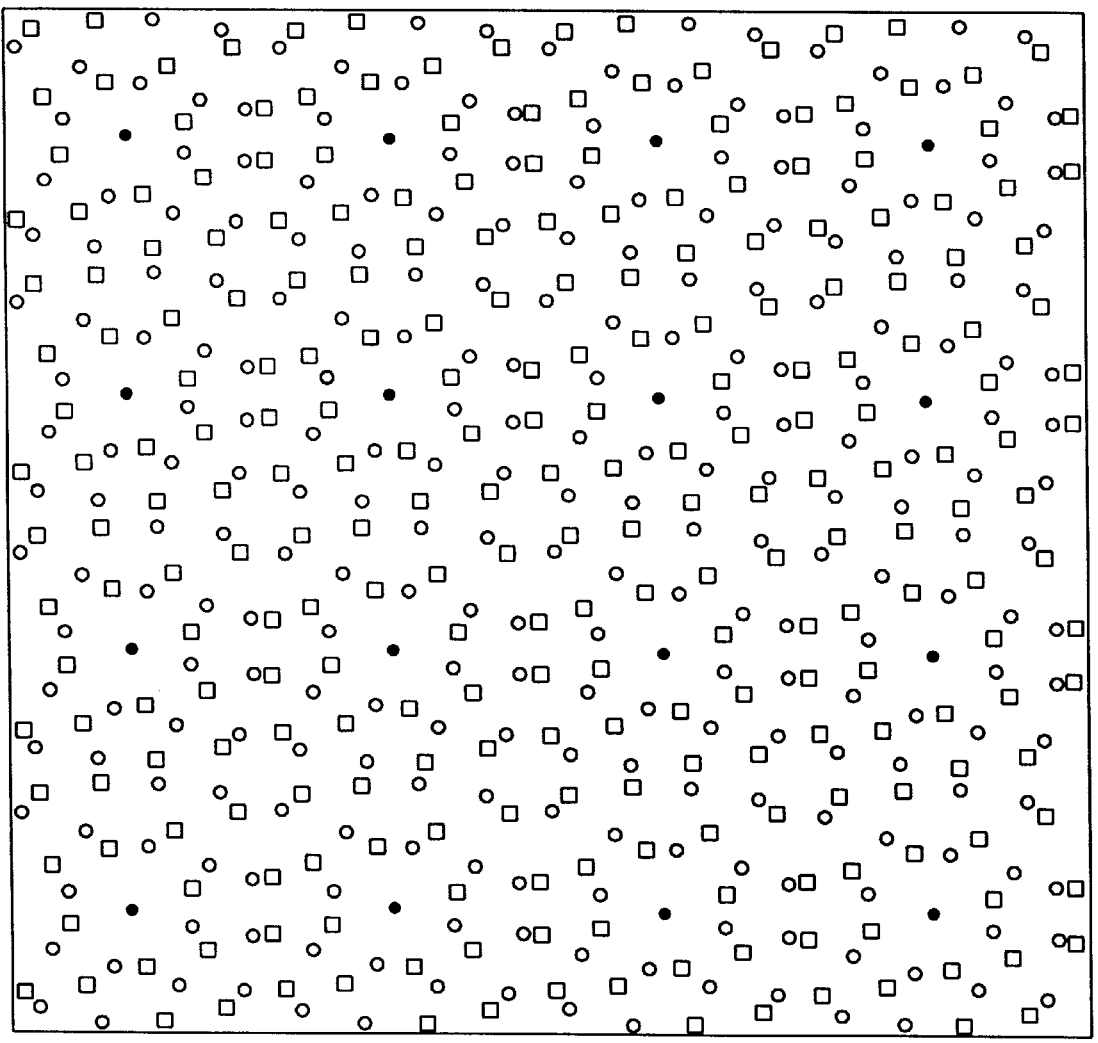
FIG. 11 is a drawing showing the texture noise when the screen angles are set at 14 and 76 degrees.

The unit gradation patterns for the third and fourth colors are formed by using threshold matrices in which small threshold components are aligned diagonally, as shown in FIGS. 5(a) and 5(c). Based on this, third and fourth unit gradation patterns in which dot images are formed diagonally may be formed, as shown in FIGS. 5(b) and 5(d). In this embodiment, the diagonal lines on which dot patterns are formed in the third and fourth unit gradation patterns are set such that they are perpendicular to each other. Since it is not necessary to consider the screen angles of the unit gradation screens of the first and second gradation pattern images, the first through fourth unit gradation patterns may be aligned such that their screen angles are different from one another by 20 degrees or more. Through this setting, the ring texture (rosettes) as shown in FIGS. 10 and 11 does not stand out. Because the first through fourth unit gradation patterns may be aligned such that the difference between screen angles of any two pattern images is 20 degrees or more, the third and fourth unit gradation patterns may be formed using the non-line dot formation method.

The reason that the screen angles of the first through fourth unit gradation patterns may be aligned such that they are different from one another by 20 degrees or more in this embodiment is explained below.

Figures 8A, 8B:
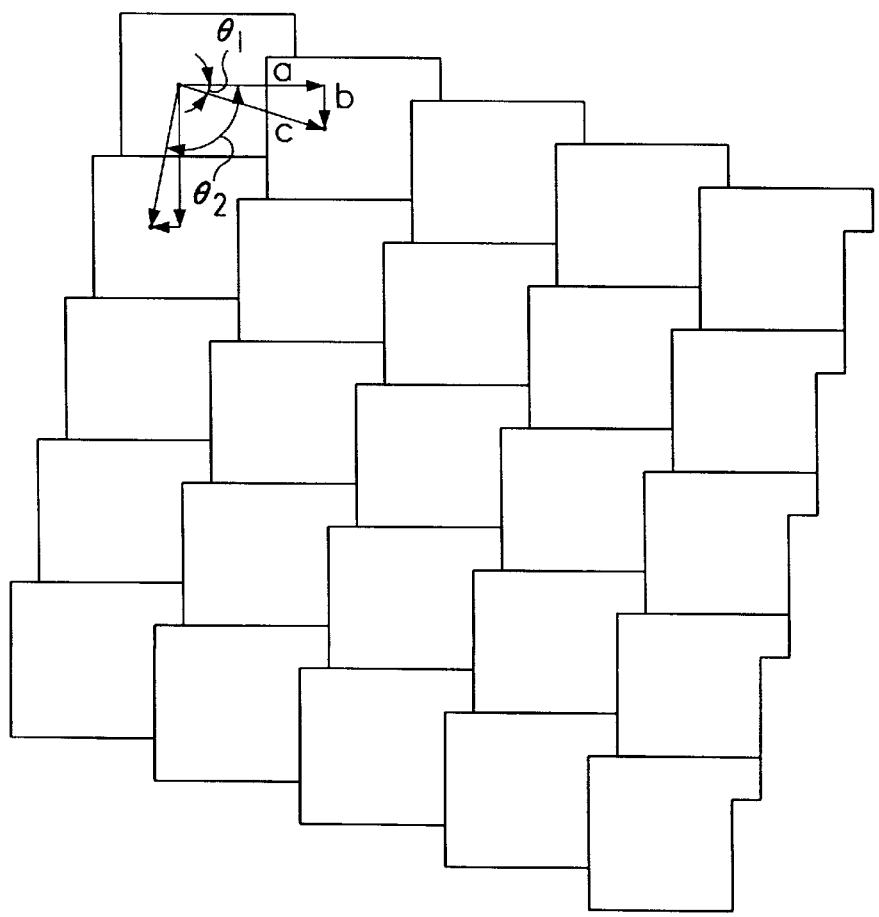
FIGS. 8(a) and 8(b) are drawings to explain the screen angle setting method for the conventional example.
Figure 9A:
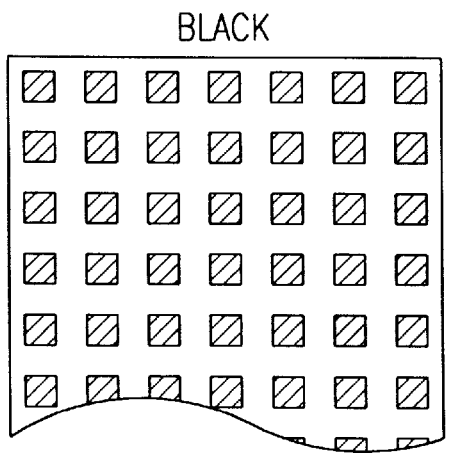
FIGS. 9(a) through 9(d) are drawings to explain the overlapping and side-by-side dot alignments caused by misalignment in printing.
Figure 9B:
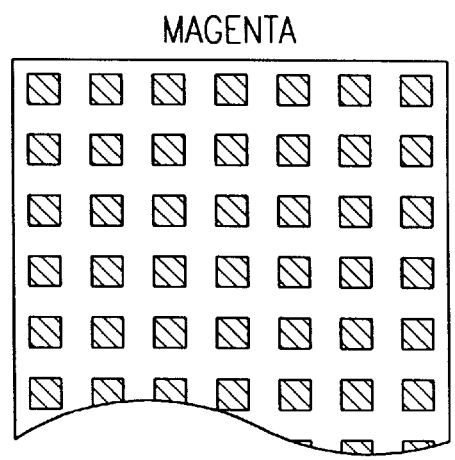
Figure 9C:
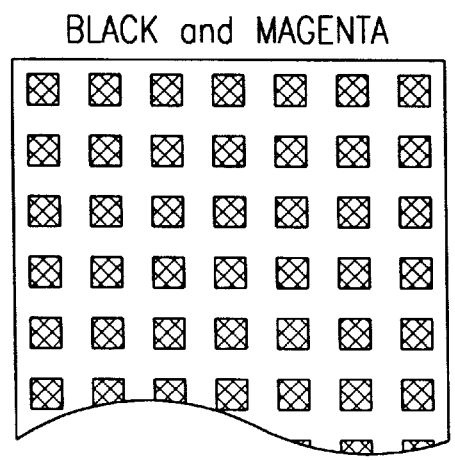
Figure 9D:
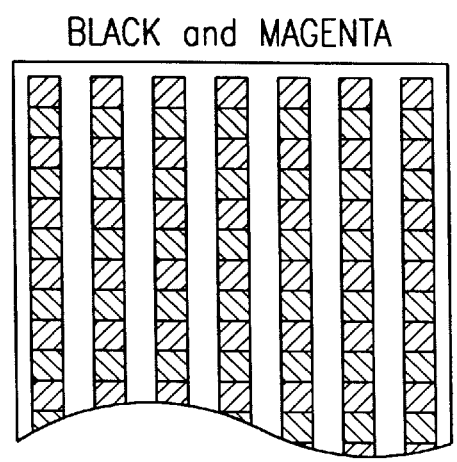

For example, the setting of the screen angles using a threshold matrix shown in FIG. 8, whose resolution 'c' is around 4, will essentially be as shown in Table 1, and the screen angles will be selected from among examples (A) through (H).

However, where the unit gradation patterns for the four colors are all formed using the conventional non-line dot formation method, regardless of which combination of screen angles for the four colors (yellow, magenta, cyan, black) is selected from among (A) through (H) of Table 1, the difference between one screen angle and another will become small. This is the result of the two-directional nature of screen angles, which was made clear in the explanation of the conventional example. Consequently, regardless of which combination is selected, it is impossible to set the screen angles for the first through fourth unit gradation patterns such that the difference between any two screen angles is 20 degrees or more.

TABLE 1

|    | (A)  | (B)   | (C)   | (D)   | (E)   | (F)   | (G)   | (H)   |
|----|------|-------|-------|-------|-------|-------|-------|-------|
| a  | 4    | 4     | 3     | 3     | 2     | 2     | 2     | 1     |
| b  | 0    | 1     | 2     | 2     | 3     | 3     | 4     | 4     |
| c  | 4.00 | 4.12  | 4.47  | 3.61  | 4.24  | 3.61  | 4.47  | 4.12  |
| θ1 | 0°   | 14°   | 27°   | 34°   | 45°   | 56°   | 63°   | 76°   |
| θ2 | 90°  | 104°  | 117°  | 124°  | 135°  | 146°  | 153°  | 166°  |

In contrast, in the multi-color image forming apparatus of this embodiment, with regard to two of the four recording colors, the unit gradation patterns for these two recording colors may be aligned such that their screen angles are different from each other by 90 degrees, by forming the dots in lines that are perpendicular to each other.

In other words, in the conventional example, for a 0-degree screen angle and a 90-degree screen angle, the alignment of the unit gradation patterns will be the same as shown in column (A) of Table 1 (a=4, b=0, c=4), and therefore, aligning the unit gradation patterns using screen angles that have a difference of 90 degrees between them was not different from aligning them using the same screen angles (0 degrees).

However, in this embodiment, because the unit gradation patterns for two colors are formed such that the dots are made to grow in lines that are perpendicular to each other, the screen angles are essentially different, even if both unit gradation patterns are aligned such that they are both a=4, b=0 and c=4. Consequently, the unit gradation patterns may be aligned such that their screen angles are different from each other by 90 degrees without causing color unevenness or texture noise.

Thus, two combinations of parameters may be selected from among combinations (B) through (H) for the screen angles of the remaining two colors. Therefore, if (C) or (D) is selected for one screen angle and (F) or (G) is selected for the other, the difference between any two screen angles will be 20 degrees or more. In contrast, in the conventional example, if unit gradation patterns for one recording color is aligned using the parameter combination of (A), it is necessary to select three other parameter combinations from among (B) through (H) with regard to the unit gradation patterns for the other three recording colors. Consequently, regardless of how the selection is made, there is always a pair of screen angles whose difference is 20 degrees or smaller. As described above, because the unit gradation patterns for two colors may be set such that their screen angles are different from each other by 90 degrees, there is an increase in freedom in the selection of the screen angles regarding the other two colors.

Various experimental examples that were implemented based on the explanation provided above are shown in Tables 2 through 6, which will now be explained. In Tables 2 through 6, Y, M, C and K represent the colors, i.e., yellow, magenta, cyan and black, respectively. a, b, c, θ1 and θ2 are defined in FIG. 8(b). 'Non-line' in the pattern configuration column indicates that the unit gradation pattern is one that is formed using the conventional method in which dot patterns are formed in a non-line fashion (FIGS. 6(a)–6(c), 7(a)–7(h) or 8), while 'line' indicates that the unit gradation pattern is one that is formed with a pattern comprising dot patterns are made to grow in a line, i.e., the method explained with regard to the embodiment (FIGS. 4(a)–4(d)). In this study, a multi-color image was formed and evaluation was made by preparing and overlapping each gradation pattern image in accordance with the parameters shown in the table. Here, Tables 2 and 3 represent color images formed using the conventional multi-color image forming method, while Tables 4 through 6 represent color images formed using the multi-color image forming method embodying the present invention.

TABLE 2

|    | a | b | c    | θ1  | θ2   | Pattern configuration | Color unevenness | Texture noise |
|----|---|---|------|-----|------|----------------------|------------------|---------------|
| Y: | 4 | 0 | 4.00 | 0°  | 90°  | Non-line             |                  |               |
| M: | 4 | 0 | 4.00 | 0°  | 90°  | Non-line             | X                | ○             |
| C: | 4 | 0 | 4.00 | 0°  | 90°  | Non-line             |                  |               |
| K: | 4 | 0 | 4.00 | 0°  | 90°  | Non-line             |                  |               |

TABLE 3

|    | a | b | c    | θ1  | θ2   | Pattern configuration | Color unevenness | Texture noise |
|----|---|---|------|-----|------|----------------------|------------------|---------------|
| Y: | 4 | 0 | 4.00 | 0°  | 90°  | Non-line             |                  |               |
| M: | 4 | 1 | 4.12 | 14° | 104° | Non-line             | ○                | X             |
| C: | 1 | 4 | 4.12 | 76° | 166° | Non-line             |                  |               |
| K: | 3 | 3 | 4.24 | 45° | 135° | Non-line             |                  |               |

TABLE 4

|    | a | b | c    | θ1  | θ2   | Pattern configuration | Color unevenness | Texture noise |
|----|---|---|------|-----|------|----------------------|------------------|---------------|
| Y: | 4 | 0 | 4.00 | 0°  |      | Line                 |                  |               |
| M: | 4 | 2 | 4.47 | 27° | 117° | Non-line             | ○                | ○             |
| C: | 2 | 4 | 4.47 | 63° | 153° | Non-line             |                  |               |
| K: | 4 | 0 | 4.00 | 90° |      | Line                 |                  |               |

TABLE 5

|    | a | b | c    | θ1  | θ2   | Pattern configuration | Color unevenness | Texture noise |
|----|---|---|------|-----|------|----------------------|------------------|---------------|
| Y: | 3 | 3 | 4.24 | 45° |      | Line                 |                  |               |
| M: | 4 | 1 | 4.12 | 14° | 104° | Non-line             | ○                | ○             |
| C: | 1 | 4 | 4.12 | 76° | 166° | Non-line             |                  |               |
| K: | 3 | 3 | 4.24 | 135°|      | Line                 |                  |               |

TABLE 6

|    | a | b | c    | θ1   | θ2 | Pattern configuration | Color unevenness | Texture noise |
|----|---|---|------|------|----|----------------------|------------------|---------------|
| Y: | 4 | 0 | 4.00 | 0°   |    | Line                 |                  |               |
| M: | 3 | 3 | 4.24 | 45°  |    | Line                 | ○                | ○             |
| C: | 3 | 3 | 4.24 | 135° |    | Line                 |                  |               |
| K: | 4 | 0 | 4.00 | 90°  |    | Line                 |                  |               | where:

The symbol "○" means that color unevenness (or texture noise) is prevented from occurring.

The symbol "x" means that color unevenness (or texture noise) occurs.

As is clear from Tables 2 and 3, where the conventional multi-color image forming method is used, it is not possible to prevent both color unevenness and texture noise. In contrast, as is clear from Tables 4 through 6, in each of these experimental examples, both color unevenness and texture noise can be prevented from occurring.

As explained above, in this embodiment, the first and second gradation pattern images for two of the recording colors for the color image are formed using unit gradation patterns in which dot patterns are made to grow linearly in directions perpendicular to each other. Consequently, variation in the area in which the dots of the two colors overlap, the variation being caused by the variation in printing position, may be minimized, and therefore the occurrence of color unevenness may be eliminated. In addition, because the first and second gradation pattern images for the two colors are formed using the above described unit gradation patterns, degrees of freedom in the setting of the screen angles of the third and fourth unit gradation patterns increase The unit gradation patterns for the other two colors may be non-line or line patterns and may be aligned in which screen angles thereof are different from that of the first or second line gradation patterns by 20 degrees or more, and the occurrence of texture noise may be eliminated. As explained above, using this embodiment, multi-color images having no color unevenness or texture noise may be obtained.

The variations of the embodiment will now be described. In the embodiment described above, the first and second unit gradation patterns are formed using line patterns having a 0-degree angle and 90-degree angle relative to the screen angle. However, the present invention is not limited to this, and other variations are acceptable so long as the directions in which the dots are made to grow for the first and second unit gradation patterns differ by 90 degrees, using threshold matrices of the same size. 'Matrices of the same size' here means that they share the same resolution 'c'. One example is shown in FIGS. 5(*a*)–5(*d*). FIG. 5(*a*) is threshold matrix 5 to set the direction in which dot patterns are made to grow at a 135-degree angle relative to the screen angle of the unit gradation patterns, as shown in FIG. 5(*b*), and FIG. 5(*c*) is threshold matrix 6 to set the direction in which dot patterns are made to grow at 45 degrees relative to the screen angle of the unit gradation patterns, as shown in FIG. 5(*d*). Input image information 60 here is assumed to be level 6. When the angles of line patterns 7 and 8 are set to be 45 degrees and 135 degrees, respectively, as described above, (B) and (H) of Table 1 may be used for the setting for the other two colors. In other words, setting should be made using one of the (A), (B) and (H) matrices so that perpendicular patterns will be formed regarding the first two colors. Where the method in which the output pattern is individually used for each level of the input image information without using threshold matrices (the method in which a look-up table is used), the same effect may be obtained by forming two of the output patterns in lines that are perpendicular to each other.

As described above, the multi-color image forming apparatus is constructed such that at least two of the gradation pattern images for the recording colors are formed using unit gradation patterns constituted by line patterns and such that the angles of the two line patterns are perpendicular to each other. As a result, the change in the size of the area of the part where dots overlap due to variation in printing position may be reduced and the difference of screen angles between gradation patterns for any two recording colors may be set to be large. Consequently, the occurrence of color unevenness may be eliminated and multi-color images in which the texture is inconspicuous may be obtained.

The multi-color image forming method is constructed such that the first gradation pattern image is formed using unit gradation patterns having a line pattern in the direction corresponding to the first screen angle and the second gradation pattern image is formed using unit gradation patterns having a line pattern in the direction corresponding to the second screen angle which is different from the first screen angle by 90 degrees. Because of this, the change in the area of the part where dots are overlapped due to variation in printing position may be reduced and the difference of screen angles between unit gradation patterns for any two recording colors may be set to be large. Consequently, the occurrence of color unevenness may be eliminated and multi-color images in which the texture is inconspicuous may be obtained.

In addition, by aligning the unit gradation patterns other than the first and second gradation pattern images such that their screen angles are different from the first or second screen angles by 20 degrees or more, multi-color pattern images in which the texture is inconspicuous may be obtained.

Further, by forming each of the gradation patterns using a threshold matrix that corresponds to each screen angle, the occurrence of color unevenness may be easily eliminated and multi-color images in which the texture is inconspicuous may be obtained.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image forming apparatus comprising:
    an image signal input section to which an image signal is inputted;
    an image forming device which forms gradation pattern images, corresponding to at least a first color and a second color, by means of said image signal;
    an image recording device which overlaps said gradation pattern images to form a multi-color image;
    a controller which is capable of controlling said image forming device so that:
        a first gradation pattern image for said first color is formed by aligning a plurality of first unit gradation patterns alone one screen angle, wherein each said first unit gradation pattern is constituted by dots that extend linearly in a first direction corresponding to a first screen angle; and
        a second gradation pattern image for said second color is formed by aligning a plurality of second unit gradation patterns along another screen angle which is different from said one screen angle, wherein each said second unit gradation pattern is constituted by dots that extend linearly in a second direction corresponding to a second screen angle, wherein said second direction is substantially perpendicular to said first direction.

2. An image forming apparatus as defined in claim 1, wherein said controller is capable of further controlling said image forming device so that a third gradation pattern image for a third color is formed by aligning a plurality of third unit gradation patterns at a third screen angle, wherein each said third unit gradation pattern is constituted by dots that extend linearly in a third direction corresponding to said third screen angle, wherein said third screen angle is different from said first screen angle by at least 20 degrees.

3. An image forming apparatus as defined in claim 2, wherein said third screen angle is different from said second screen angle by at least 20 degrees.

4. An image forming apparatus as defined in claim 2, wherein said controller is capable of further controlling said image forming device so that a fourth gradation pattern image for a fourth color is formed by aligning a plurality of fourth unit gradation patterns at a fourth screen angle, wherein each said fourth unit gradation pattern is constituted by dots that extend linearly in a fourth direction corresponding to said fourth screen angle, wherein said fourth screen angle is different from each of said first screen angle and said second screen angle by at least 20 degrees.

5. An image forming apparatus as defined in claim 1, wherein said controller is further capable of controlling said image forming device so that each of said plurality of first unit gradation patterns is formed by means of a first threshold matrix and so that each of said plurality of second unit gradation patterns is formed by means of a second threshold matrix.

6. An image forming apparatus as defined in claim 1, wherein said image forming apparatus is a full color copying machine.

7. An image forming method comprising the steps of:

inputting an image signal;

forming a first gradation pattern image corresponding to a first color by means of the inputted image signal by aligning a plurality of first unit gradation patterns along one screen angle, wherein each said first unit gradation pattern is constituted by dots that extend linearly in a first direction corresponding to a first screen angle;

forming a second gradation pattern image corresponding to a second color by means of the inputted image signal by aligning a plurality of second unit gradation patterns along another screen angle which is different from said one screen angle, wherein each said second unit gradation pattern is constituted by dots that extend linearly in a second direction corresponding to a second screen angle, wherein said second direction is substantially perpendicular to said first direction; and overlapping said first and said second gradation pattern images to form a multi-color image.

8. An image forming method as defined in claim 7 further comprising:

forming a third gradation pattern image for a third color by aligning a plurality of third unit gradation patterns at a third screen angle, wherein each said third unit gradation pattern is constituted by dots that extend linearly in a third direction corresponding to said third screen angle, wherein said third screen angle is different from said first screen angle by at least 20 degrees.

9. An image forming method as defined in claim 8, wherein said third screen angle is different from said second screen angle by at least 20 degrees.

10. An image forming method as defined in claim 8, further comprising the step of:

forming a fourth gradation pattern image for a fourth color by aligning a plurality of fourth unit gradation patterns at a fourth screen angle, wherein each said fourth unit gradation pattern is constituted by dots that extend linearly in a fourth direction corresponding to said fourth screen angle, wherein said fourth screen angle is different from each of said first screen angle and said second screen angle by at least 20 degrees.

11. An image forming method as defined in claim 7, wherein each of said plurality of first unit gradation patterns is formed by means of a threshold matrix that corresponds to said first screen angle, and wherein each of said plurality of second unit gradation patterns is formed by means of a threshold matrix that corresponds to said second screen angle.

12. An image forming apparatus as defined in claim 4, wherein said fourth screen angle is different from said third screen angle by at least 20 degrees.

13. An image forming method as defined in claim 10, wherein said fourth screen angle is different from said third screen angle by at least 20 degrees.

14. An image forming device for forming a multi-color image based on inputted image data, comprising:

an input device for receiving image data;

a control device for receiving said image data from said input device and for controlling formation of said multi-color image based on said image data; and an image forming device, responsive to said control device, for forming an image based on said image data;

said control device controlling formation of said multi-color image by forming at least three gradation pattern images, a color of each of said gradation patterns being different;

said at least three gradation pattern images including a first gradation pattern image comprising a plurality of first gradation patterns aligned along a first screen angle, each of said first gradation patterns comprising dots that grow linearly along a first direction;

said at least three gradation pattern images including a second gradation pattern image comprising a plurality of second gradation patterns aligned along a second screen angle, each of said second gradation patterns comprising dots that grow linearly along a second direction, said second screen angle being approximately 90 degrees from said first screen angle;

said at least three gradation pattern images including a third gradation pattern image comprising a plurality of third gradation patterns aligned along a third screen angle, said third screen angle being different from said first screen angle by at least 20 degrees;

wherein said image forming device overlaps said at least three gradation pattern images to form said image.

15. An image forming device in accordance with claim 14, wherein said at least three gradation pattern images including a fourth gradation pattern image comprising a plurality of fourth gradation patterns aligned along a fourth screen angle, said fourth screen angle being different from said first screen angle by at least 20 degrees, said fourth screen angle being different from said third screen angle by at least 20 degrees.

16. An image forming device in accordance with claim 15, wherein each of said third gradation patterns comprises dots that grow linearly along a third direction and each of said fourth gradation patterns comprises dots that grow linearly along a fourth direction.

* * * * *